United States Patent
Kallam

(10) Patent No.: US 8,245,063 B2
(45) Date of Patent: Aug. 14, 2012

(54) CLOCK SELECTION FOR A COMMUNICATIONS PROCESSOR HAVING A SLEEP MODE

(75) Inventor: Subba Reddy Kallam, Hyderabad (IN)

(73) Assignee: Redpine Signals, Inc., San Jose, CA (US)

( * ) Notice: Subject to any disclaimer, the term of this patent is extended or adjusted under 35 U.S.C. 154(b) by 1086 days.

(21) Appl. No.: 12/144,853

(22) Filed: Jun. 24, 2008

(65) Prior Publication Data
US 2009/0319817 A1     Dec. 24, 2009

(51) Int. Cl.
*G06F 1/00* (2006.01)
*G06F 1/32* (2006.01)
(52) U.S. Cl. ........... 713/322; 713/300; 713/320; 327/99
(58) Field of Classification Search .................. 713/300, 713/320, 322; 327/99
See application file for complete search history.

(56) References Cited

U.S. PATENT DOCUMENTS
6,600,345 B1 *  7/2003  Boutaud .......................... 327/99
* cited by examiner

*Primary Examiner* — Kim Huynh
*Assistant Examiner* — Michael J Brown
(74) *Attorney, Agent, or Firm* — File-EE-Patent.com; Jay A. Chesavage

(57) ABSTRACT

A clock selector operative on two clocks operating on different domains and responsive to a SELECT input provides a transition from a first clock to a second clock, and from a second clock to a first clock with a dead zone therebetween. The delay is provided by a doublet register having a first register coupled to a second register, the two registers operative on one of the clock domains. Additionally, a clock selector is operative on two clocks which are each accompanied by a clock availability signal where the state machine provides a variety of states to create a dead zone between selections, and to bring the state machine to a known state until a clock signal is again available.

17 Claims, 7 Drawing Sheets

Host Req timing

Host Clock/Network Clock selection

Host Clock/Network Clock selection

CLK Switching with two clocks present

Timing Diagram

Host Clock/Network Clock selection

Annotated Timing Diagram

CLOCK SELECTION FOR A COMMUNICATIONS PROCESSOR HAVING A SLEEP MODE

FIELD OF THE INVENTION

The present invention relates to clock selection for communications systems having a sleep mode. In particular, the invention is directed to wireless communications systems having an accurate network clock, a low speed clock for a sleep mode, and a host clock for an operational mode.

BACKGROUND OF THE INVENTION

FIG. 1A shows a prior art communications system, which includes a System on a Chip (SoC) 110, typically comprising baseband processing for a wireless communications system, which is coupled to an RF Front End 112 which accepts signals from antenna 113, and performs the sequential operations of RF amplification, mixing to baseband using a local oscillator, and conversion to digital sampled signals using an analog to digital converter (ADC), and delivering these signals to the SoC 110 over interface 111. A transmit stream may be generated by SoC 110, which is provided to RF front end 112 as a baseband digital signal, which the RF front end 112 converts to an analog signal using a digital to analog converter (DAC). Thereafter, the analog signal is mixed to a modulation frequency, amplified, and transmitted to antenna 113. The SoC 110 accepts a clock signal NET_CLK generated by an accurate network clock source 106. Generating the baseband modulation signals requires a relatively accurate clock compared to the other operations of the SoC 110, and a low frequency SLEEP_CLK is sourced by a sleep clock generator 104. The SLEEP_CLK may be coupled to a power sequencer 114 such as for powering up the SOC 110 and RF front end 112 when periodic beacons are received. The SoC 110 may also receive a HOST_CLK from a host clock generator 108, which is also coupled to an applications processor 102 through host interface 116, which may be a synchronous interface according to a known standard such as Peripheral Component Interconnect (PCI as described in www.pcisig.com), Universal Serial Bus (USB as described in www.usb.org), Secure Digital IO (SDIO as described in www.sdcard.org), or any host interface known for interconnecting an applications processor to a communications system through an interface.

For battery powered devices, power saving modes are related to the useful time the device may be operated on a single charge. One prior art power saving mode uses a power sequencer 114, which powers down various components of the system, which is shown as separated into components related to transmitting and receiving wireless signals PD2 such as associated with the baseband interface 111 of the SoC 110. For example, if there is no anticipated activity on baseband interface 111, PD2 may be asserted, thereby putting RF front end 112 into a powerdown state when no transmit or receive activity is anticipated, and PD1 may be asserted when there is no anticipated data across the host interface 116. The assertion of partial powerdown for power-consuming parts of a processing element is known as a "sleep mode", and may involve operation at a lower clock rate, or partial or complete powerdown of the associated system. Crystal oscillators such as those used to generate the host clock 108 and network clock 106 tend to consume a large amount of power compared to low frequency sleep clock 104, in part because the displacement currents generated by each clock transition in the oscillator as well as the circuitry the clock is delivered to are proportional to clock rate, such that for all other considerations being equal, a lowest rate clock tends to result in a lower power dissipation.

One problem of power saving operations is the requirement for the SoC 110 to maintain any existing network connections, and create new connections as required, both operations which require the SoC 110 to come out of sleep mode periodically and check for any pending traffic to be received or transmitted before going back into a sleep mode, and to be able to do this in a manner which does not cause any network connections or requests to time out for failure to respond. In one prior art system, the sleep clock 104 operates a wake-up timer within power sequencer 114, such that the SoC 110 and RF front end 112 are powered up to receive periodically transmitted signals such as beacons, and any required transmit frames are sent during these intervals.

Outside of such wake-up intervals, if the communication SoC 110 does not have a clock, it will not be able to serve incoming requests 103 from the application processor 102. In one prior art system, the SoC 110 indicates to the application processor 102 that it is entering a sleep mode, and the applications processor 102 uses a wakeup protocol with sequencer 114 to bring the system out of sleep mode when making a request 103. In this system, the application processor 102 will queue requests and assert a powerup request to sequencer 114. When the SOC 110 comes out of sleep mode and has clock signals available, it indicates to the application processor 102 through a handshake mechanism across interface 116 that the application processor 102 may start sending requests and other relevant events.

FIG. 1B shows the timing associated with this prior art wake-up method. Until request time 152, only sleep clock 168 is active, and the host clock 164 and network clock 170 are powered down. After host request 152, HOST_CLK 164 is in a shutdown state until Wakeup SoC is asserted 154, where the HOST_CLK stabilizes during an initialization time, and at time 156, the HOST_CLK is stabilized and the request is handled, with the network clock 170 applied thereafter 156. After the network events are handled from time 156 to time 158, host clock 164 enters a shutdown mode at time 158. The network clock 170 may stay active after end of request handling at time 158 to time 160 to complete the processing of any transmit network traffic which is generated, and enters a sleep mode thereafter 160.

There are many drawbacks associated with the process of FIGS. 1A and 1B. The latency in response from time 152 to time 154 followed by initialization until time 156 consumes additional time, during which interval the SOC has to be in a wake up mode prior to handling any actual requests, which also represents a power consumption inefficiency. The latency from time 152 to time 156 also results in reduced throughput if there are many such requests handled sequentially. Another inefficiency is that the applications processor 202 buffers the pending events without any of them being handled until the wake-up process from time 152 to time 156 is completed. Additionally, certain protocols such as Voice Over IP (VOIP) require immediate handling without the latency associated with wake-up protocols.

OBJECTS OF THE INVENTION

A first object of this invention is a clock switching circuit for providing a glitch-free transition from one clock source to another clock source at a different frequency.

A second object of the invention is a first and second doublet register, the first doublet register input coupled to a select input through an OR gate, the OR gate having another input coupled to the second doublet register output, an AND gate having one input coupled to the select input and the other input coupled to the first doublet register output, the output of the AND gate coupled to the input of the second doublet register input, and a clock output generated by the output of a second OR gate having inputs coupled to the outputs of a second AND gate and a third AND gate, the second AND gate coupled to a first clock source and the inverted output of the first doublet register, and second AND gate coupled to a second clock source and the output of the second doublet register, the first doublet register being clocked by the falling edge of the first clock and the second doublet register being clocked by the falling edge of the second clock.

SUMMARY OF THE INVENTION

A clock selection function accepts a first clock input, a second clock input, a clock select, and generates a selected clock output. A first and second doublet register is formed by two registers having a doublet input coupled to one register and a doublet output coupled to the other register output, with the remaining register output coupled to the remaining register input, both registers of the doublet clocked by the same clock input. The first doublet register input is coupled to the output of an OR gate, the OR gate having one input coupled to the select input, and the other OR gate input coupled to the second doublet output. The second doublet has an input coupled to the output of an AND gate, the AND gate having a first input coupled to the select input and the other input coupled to the output of the first doublet. The first doublet output is inverted and coupled to a second AND gate, with the other input of the second AND gate coupled to the first clock input. The second doublet output is coupled to an input of a third AND gate, with the third AND gate other input coupled to the second clock input. The outputs of the second AND gate and third AND gate our ORed together to form the clock output.

In another embodiment of the invention for use when either of a HOST_CLK or a NET_CLK clock source is unavailable, as indicated by an associated HST_CLK_AVAIL or NET-CLK_OFF input, respectively, a clock select state machine clocked by NET_CLK has a first input HCA formed from a doublet register clocked by NET_CLK and a second input NCO formed from a doublet register clocked by NET_CLK. The clock select state machine generates EN_HSTCLK output, which is ANDED with HST_CLK_AVAIL and fed to a first doublet register clocked by HOST_CLK to generate SEL_HSTCLK, which is ANDED with HOST_CLK and ORed with the ANDing of EN_NETCLK and NET_CLK. The state machine moves between an IDLE state where EN_NETCLK is enabled and EN_HSTCLK is not enabled, a SLEEP state where EN_NETCLK is not enabled and EN_HOSTCLK is enabled, and WAIT, where neither EN_NETCLK nor EN_HOSTCLK is enabled. The state transitions are IDLE to SLEEP when NCO is asserted, SLEEP to WAIT when NCO is not asserted, and WAIT to IDLE a programmable number of NET_CLK cycles after entering WAIT.

DETAILED DESCRIPTION OF THE INVENTION

Figure 1A:
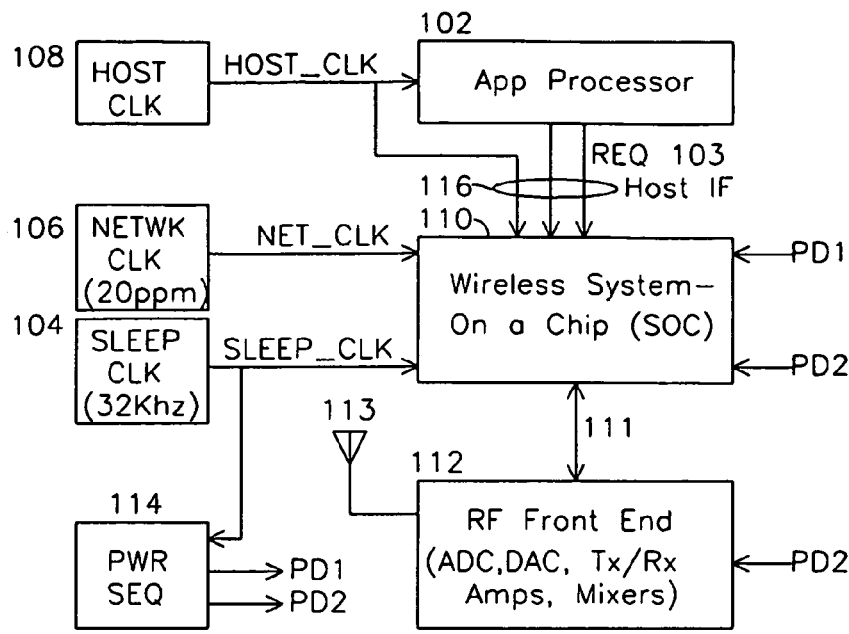
FIG. 1A shows the block diagram for a prior art wireless system.
Figure 1B:
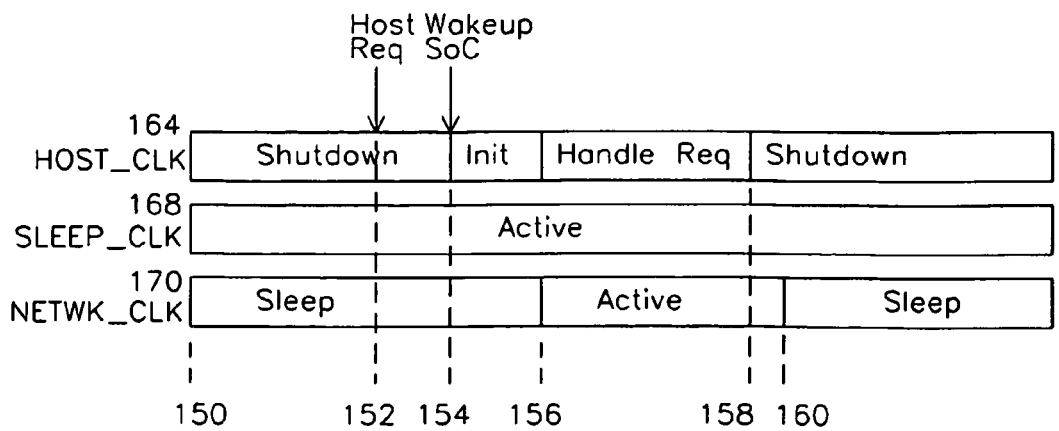
FIG. 1B shows a time diagram for sleep mode and active modes for the system of FIG. 1A.
Figure 2A:
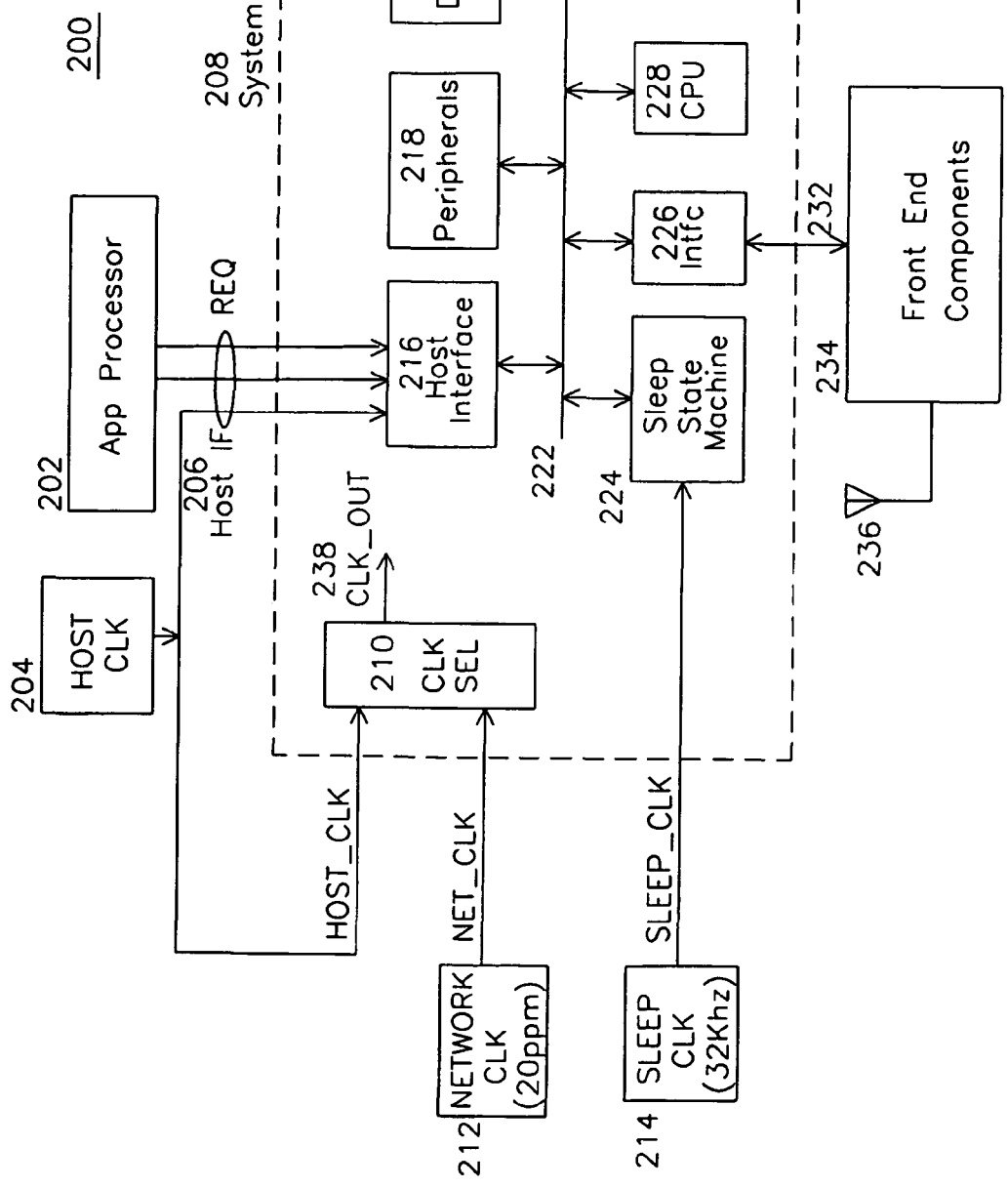
FIG. 2A shows the block diagram for a wireless signal processor having a clock selection for sleep mode.

FIG. 2A shows a wireless communications processor 200 including a wireless processor system on a chip (SOC) 208 coupled to an applications processor 202 which sends and receives data to the SOC 208 through a host interface 206. The SOC 208 integrates all of the functions of the wireless system other than the front end components 234 described in FIG. 1A, including ADC, DAC, mixers, amplifiers, and other functions required to modulate and demodulate from antenna 236 to baseband digital interface 232. The wireless processor 208 includes a host interface 216 to an internal bus 222, which bus is also coupled to peripherals 218, a DMA controller 220, processor 228, memory 230, an interface 226 to the front end 234, and a sleep state machine 224. System on a chip wireless processor 208 accepts a network clock 212 which has higher accuracy than host clock 204 or sleep clock 214. During sleep mode, the sleep clock 214 is coupled to sleep state machine 224, which may provide periodic wake-up signals to the processor 208. Network clock 212 may be in a powerdown state, such as under control of the sleep state machine 224, and during intervals when it is not important to transmit or receive wireless signals using the accurate but high power load network clock 212, the wireless processor 208 may operate on host clock 212, which is selected by selector 210 and delivered. The clock selector 210 is controlled by applications processor 208 such as through a request through the host interface 206. The processor of FIG. 2A may operate in a sleep mode when there is no activity, or if there is no network activity, it can operate on HOST_CLK, and finally, when there is network traffic to receive or transmit, the wireless processor 208 can power the network clock and use this clock for wireless transmit and receive protocols.

Figure 2B:
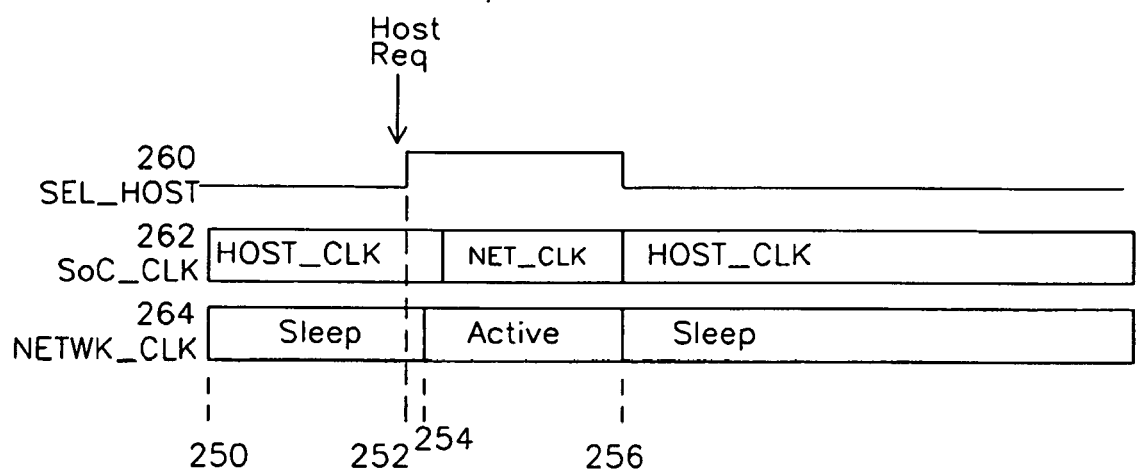
FIG. 2B shows a time diagram for sleep mode and active modes for the system of FIG. 2A.

FIG. 2B shows the time sequence of operation of FIG. 2A for a host request which initiates a transmit operation. The wireless processor 208 runs on HOST_CLK from time 250 until the arrival of a host request at time 252, whereupon the processor clock 262 is switched from HOST_CLK to NET_CLK for the duration of time required to handle the request to time 256, after which the HOST_CLK is selected by 210 and provided to processor 204.

In operation with the communications processor 200 of FIG. 2, the clock selector 210 keeps the wireless processor 204 and associated circuits such as network clock 212 and front end components 234 in a low power state. In a sleep mode state, the network clock 212 will be switched off and a sleep counter 224 coupled to sleep clock 214 will be maintained. The sleep counter 224 will wake up the SOC on a periodic basis to maintain existing network connections to remote stations coupled to antenna 236. In case of a pending request from the host processor 202, the wireless processor 208 will service this event by using HOST_CLK as CLK_

OUT 238. If there is a need to immediately service the request, such as for a VOIP packet, the wireless processor 208 can interrupt the sleep state machine and enable the network clock oscillator 212. Once the network clock 212 oscillator has stabilized, the sleep state machine can instruct the clock select 210 to switch over to the network_clock 212 source and service the event.

Figure 3:
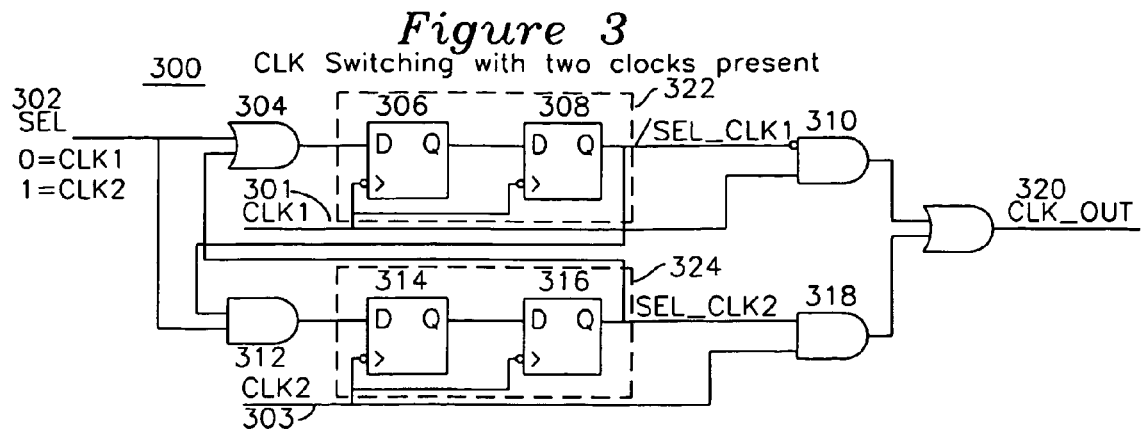
FIG. 3 shows a schematic diagram for a clock switching circuit with two available clocks.

FIG. 3 shows one example embodiment for the clock selector 210 of FIG. 2A, suitable for the case where both HOST_CLK and NET_CLK provided to clock selector 210 are continuously present. The clock selector 300 accepts a first clock input CLK1 and a second clock input CLK2, along with a SELECT input 302. Registers 306 and 308 form a first doublet register 322 with an input coupled to first register 306 input, register 306 output coupled to register 308 input, and register 308 output forming the doublet register output. The first doublet register 322 is clocked with the negative edge of the first clock CLK1, shown with the convention for inversion as a inversion bubble at the clock input. Second doublet register 324 is similarly arranged, with first register 314 and second register 316 similarly configured with inverted clock for clocking the falling edge of second clock input CLK2. First doublet register 322 generates SEL_CLK1 and second doublet register 324 generates SEL_CLK2, as will be described. OR gate 304 has one input coupled to the SEL select input 302 and the other input coupled to the second doublet 324 output SEL_CLK1. First AND gate 312 has one input coupled to SEL input 302 and the other input coupled to first doublet register output SEL_CLK1, with first AND gate output coupled to the input of second doublet register 322. The first doublet register 322 output is also inverted and coupled to second AND gate 310, with the remaining second AND gate input coupled to the first clock input. The second doublet register 324 output is coupled to an input of third AND gate 318, which other AND gate input is coupled to the second clock input CLK2. Second OR gate 320 generates the selected clock output CLK_OUT 320 by performing an OR operation on the outputs of second AND gate 310 and third AND gate 318.

Figure 4:
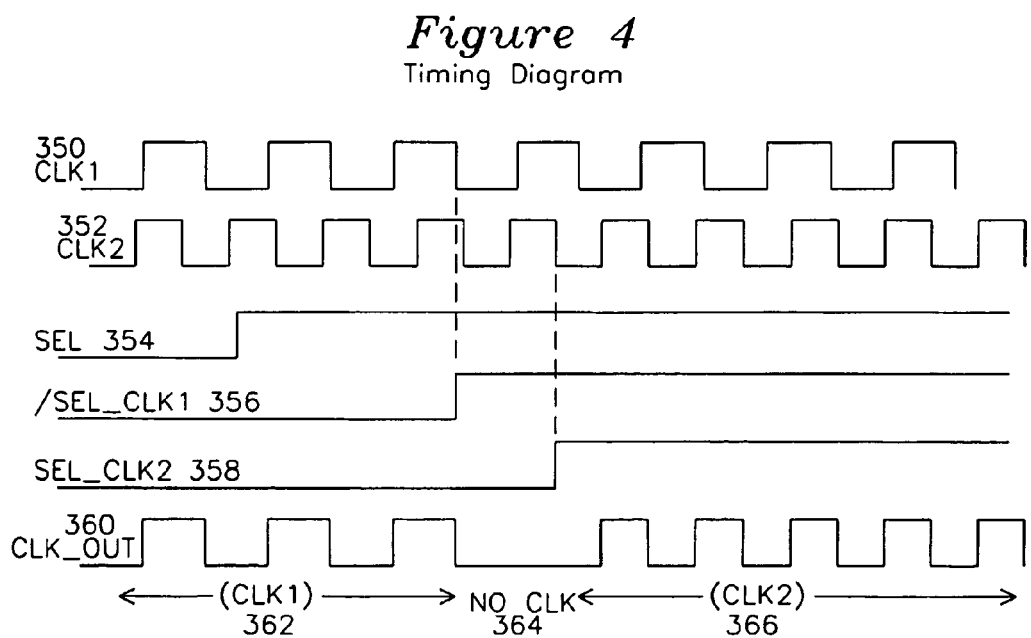
FIG. 4 shows the timing diagram for the switching circuit of FIG. 3.

FIG. 4 shows the operation of the clock selection circuit of FIG. 3. First clock 350 may represent the clock waveform for a first clock such as the host clock ordinarily used for transferring requests from the host processor interface 206 of the wireless processor 204 of FIG. 2A. Second clock input waveform 352 may represent the network clock required by the wireless processor 208 for wireless transmit and receive operations, although the power consumption for the higher frequency and higher power network clock is higher. In the first embodiment of the invention, the clock selection circuit may change from a sleep state with no clocks running to selecting a host clock for first processing requests, and then switching to the accurate network clock for transmitting or receiving wireless packets, as required by the clocking accuracy. For clarity of the example, CLK1 is shown at a slightly lower frequency than CLK2, however in a typical system the two frequencies may be any frequencies suitable for clocking static registers as shown. When SEL waveform 354 is low, /SEL_CLK1 356 and SEL_CLK2 358 settle to LOW values, which cause gate 310 to enable first clock CLK1 and disable second clock CLK2, thereby coupling CLK_OUT 320 to CLK1 waveform 360. When SEL 354 is asserted, /SEL_CLK1 is asserted two negative CLK1 edges later, and SEL_CLK2 358 is asserted two clock edges after the assertion of /SEL_CLK1. During this interval shown as 364, no output clock is generated. Upon the assertion of SEL_CLK2 358, CLK2 is coupled to CLK_OUT 360, as shown during interval 366.

Figure 5:
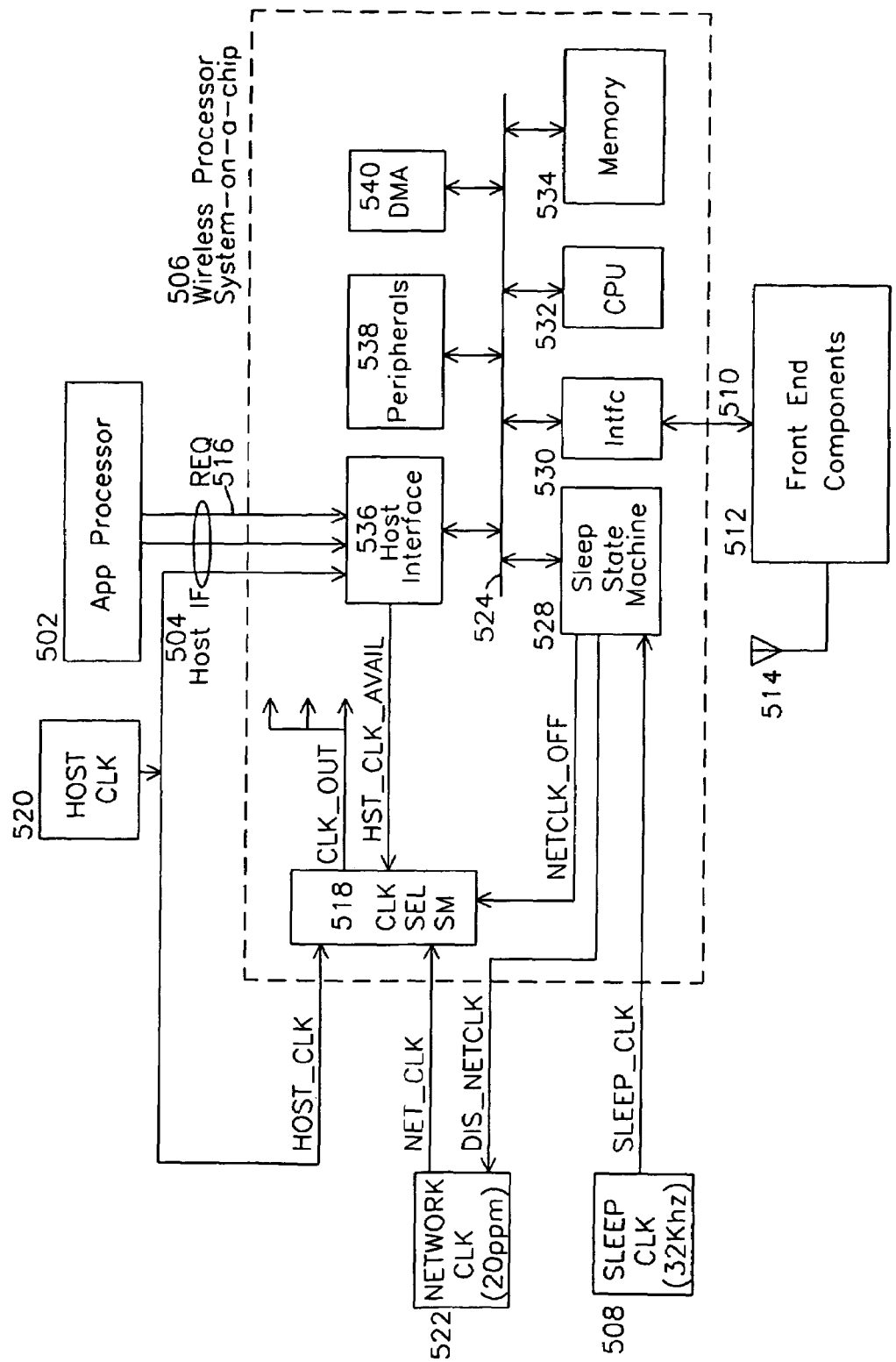
FIG. 5 shows a block diagram for a clock switching circuit with one available clock and another clock having a startup delay time.

As mentioned earlier, the clock select circuitry of FIG. 3 is suitable for the case where CLK1 and CLK2 are both available during the transition from one clock source to the other clock source. FIG. 5 shows a generalized clock selection 518 in the context of a wireless processor 506 where the HOST_CLK may not be available, as indicated by HST_CLK_AVAIL, and with a network clock NET_CLK, which is disabled by DIS_NETCLK and provided by sleep state machine 528 which generates NETCLK_OFF a stabilization time later, such that NETCLK_OFF is asserted to the state machine several cycles before and after DIS_NETCLK, such that a reliable and settled NET_CLK is available before and after NETCLK_OFF is asserted. Sleep clock 508 is a low frequency clock source which is continuously running and used by sleep state machine 528 to assert NETCLK_OFF during powerdown states, and to control powerup of the processor 506 during intervals such as beacons, when the wireless processor 506 needs to be ready to receive remote transmissions. The wireless processor 506 may include any other elements, including a bus 524 for interconnecting a processor 532 with memory 534, interfaces 530 to the front end 512, DMA controller 540, peripherals 538, and a host interface 536 to application processor 502 over an interface bus 504, which may include a host processor request 516 indicating a pending request for wireless processor 506 response.

In one embodiment of the invention as shown in FIG. 5, the application processor 502 provides data for one or more packets to be transmitted, and the related packet data is accepted and queued in a buffer of host interface 536, using the host clock 520 to buffer these packets. The buffering of packets to be transmitted by the wireless processor 506 allows the application processor to complete the transfer operation and continue with other operations. After packets from the application processor 502 are queued into the SOC 506 such as by using the host clock 520 as the clock source, the SOC 506 may start a wakeup sequence whereby the network clock 508 is enabled and settles, after which the clock select 518 may switch to network clock for those parts of the system needing it. During this mode of the invention, packets are transferred from the applications processor when the HOST_CLK is available and the NET_CLK is not available.

In another aspect of the invention, packets have been queued from the applications processor 502 for transmission, and the HOST_CLK is turned off by the applications processor. In this mode, the sleep state machine 528 requests the network clock NET_CLK 522 be taken out of disabled state such as by unasserting DIS_NETCLK, and the clock selection state machine 518 switches to NET_CLK when it is available, such as after HOST_CLK has been disabled. During this mode of operation, packets which were previously queued from the applications processor may be transmitted by the SOC 506 when the NET_CLK is available and the HOST_CLK is not available.

Figure 6:
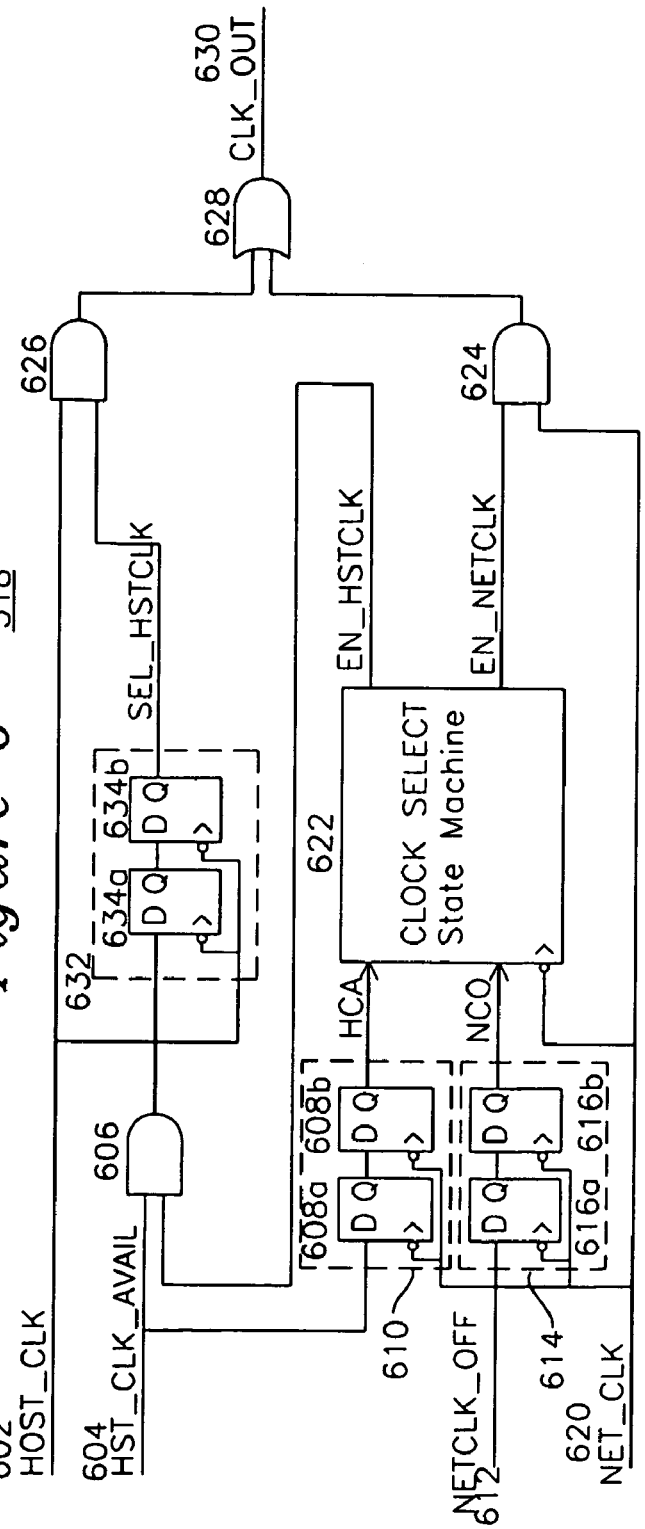
FIG. 6 shows the block diagram for an example clock selection for use in FIG. 5.

FIG. 6 shows a block diagram for one embodiment of the clock selection 518 of FIG. 5. A HOST_CLK 602 is provided, such as by the host processor interface, which interface includes an indicator HST_CLK_AVAIL, which enables the selection of HST_CLK only when this clock source is available. HST_CLK_AVAIL is generated by logic in the Host Interface 536. It is unasserted at the end of a data transaction on the host bus 504, anticipating the removal of the Host Clock, and is asserted again when a fresh transaction starts on the host interface and the HOST_CLK is again active. Similarly, when asserted, NETCLK_OFF indicates that NET_CLK is not available, a power savings measure taken by the sleep state machine 528 of FIG. 5. First doublet register 632 is clocked on the negative edge of HOST_CLK, and each doublet register such as 632 has an input coupled to first register 634a with an output coupled to the input of second register 634b, whose output forms the doublet output. Clock selection state machine 622 generates EN_HSTCLK and EN_NETCLK from inputs HCA (host clock available HST_CLK_AVAIL 604 through doublet register 610) and NCO (net clock off from NETCLK_OFF through doublet register 614). The clock select state machine 622, second doublet 610 and third doublet 614 are clocked on the negative edge of NET_CLK.

Clock selection 518 of FIG. 6 includes a first doublet register 632 clocked on the negative edge of HOST_CLK, the first doublet register 632 having an input coupled to the output of a first AND gate 606, and the output of the first doublet register 632 generating SEL_HSTCLK and coupled to the input of a second AND gate 626, the other input of which is coupled to HOST_CLK. A second doublet register input is coupled to HST_CLK_AVAIL, which is also coupled to an input of first AND gate 606. Second doublet register 610 output generates HCA, which is coupled to a clock selection state machine, and generates EN_HSTCLK which is coupled to the other input of the first AND gate 606. Third doublet register 614 input is coupled to NETCLK_OFF 612, and third doublet register output generates NCO, which is also coupled to the input of the clock select state machine 622. EN_NETCLK is generated by the clock select state machine, and is coupled to an input of third AND gate 624, the other input of which is coupled to NETCLK 620. An OR gate generates CLK_OUT from the output of the second AND gate and the output of the third AND gate. The clock select state machine, second doublet register, and third doublet register are clocked on the negative edge of NET_CLK.

Figure 7:
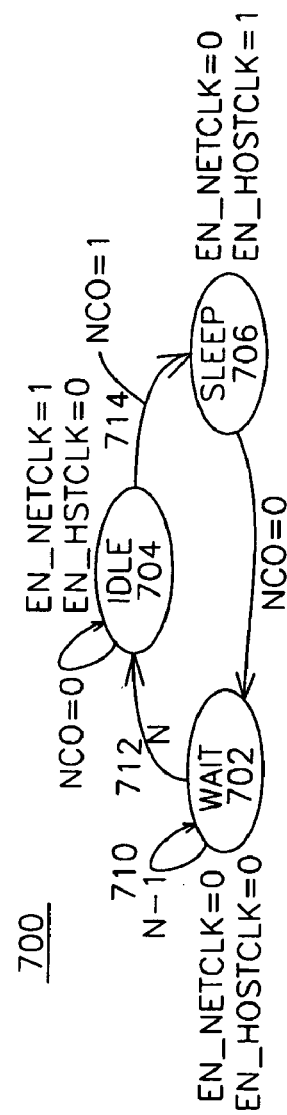
FIG. 7 shows a state diagram for a controller for FIG. 6.

One embodiment of a clock select state machine suitable for use in FIG. 6 622 is shown in FIG. 7, where the state machine generates outputs EN_NETCLK and EN_HOSTCLK, which are preferably synchronous outputs generated from state bits of the state machine, as is known in the art of state machine design. One possible set of states is IDLE 704, for which only EN_NETCLK is asserted, transitioning to SLEEP 706 if NCO=1, indicating that the network clock is about to be disabled, and in SLEEP state, only EN_HOSTCLK is asserted. SLEEP state 706 transitions to the no clock WAIT state if network clock has been turned on as indicated by NCO=0. The WAIT state prevents the propagation of glitches on CLK_OUT in the condition where NCO becomes '0' and around the same time HCA becomes '1'. A glitch can be created when FF 634b is 1 and EN_NETCLK goes '1'. Waiting for a fixed duration ensures that SEL_HSTCLK reaches '0' before EN_NETCLK is asserted. The transition from WAIT 702 with both clocks disabled to IDLE 704 requires that N clock stages pass, with the first N-1 710 in state WAIT, and the final Nth 712 in state IDLE 704.

Figure 8:
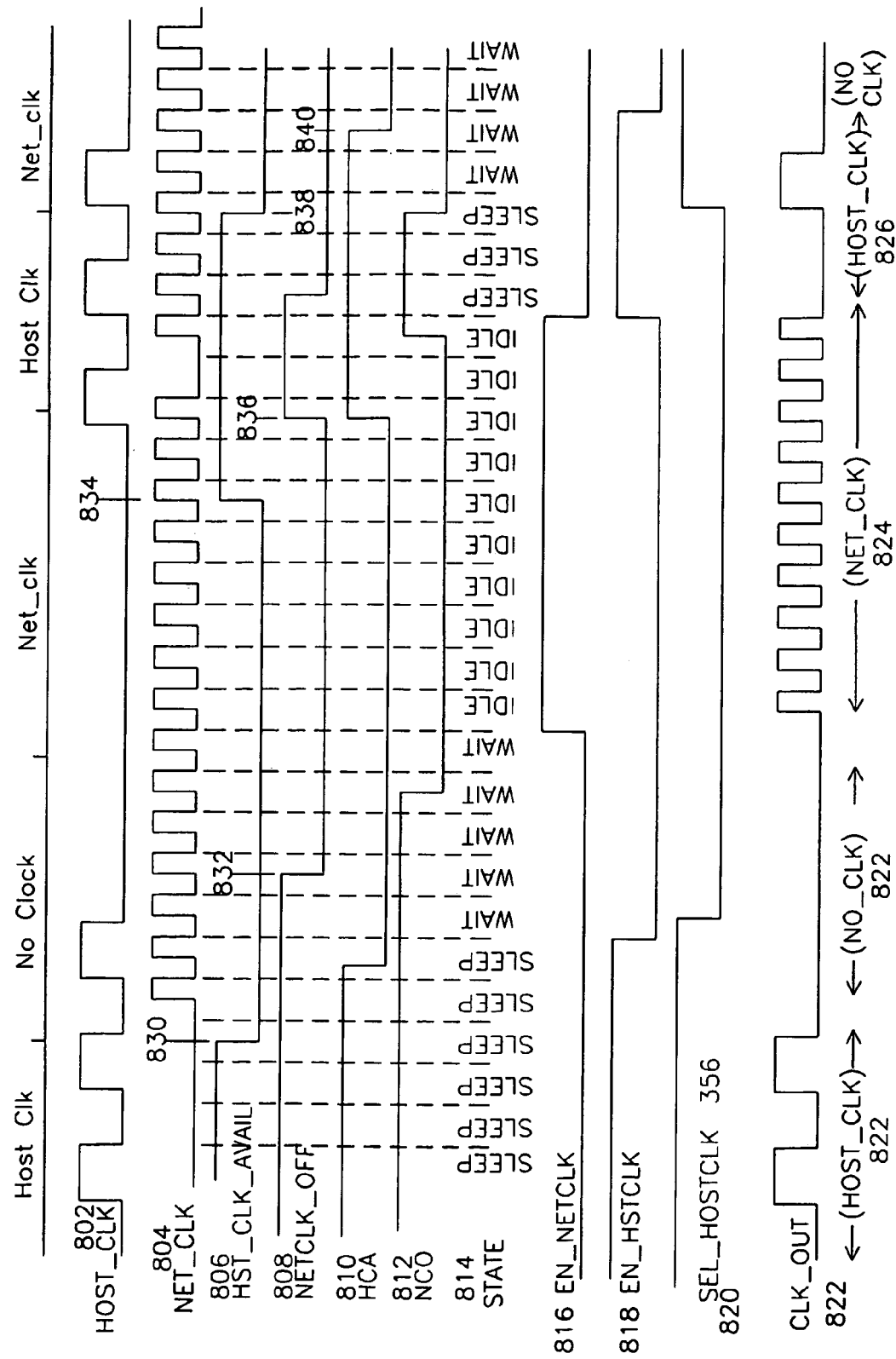
FIG. 8 shows a timing diagram for the clock selector of FIG. 6.

FIG. 8 shows the timing diagram for the example embodiment described in FIGS. 6 and 7. NET_CLK 802 is enabled by NETCLK_OFF such that the network clock oscillator runs for a longer time before and after NETCLK_OFF is unasserted. The HOST_CLK 804 is unavailable at time 830, as indicated by HST_CLK_AVAIL, and does not return until time 834. Similarly, NET_CLK 804 is turned on at time 832 and off at time 836. As can be seen from FIG. 6, HCA is a doublet delay from Host Clock Available 806, and NCO is a doublet delay from NETCLK_OFF 808. For simplicity, the diagram shows a two cycle delay, although it is understood that first doublet 632 is operative on HOST_CLK, which is not always present, and second doublet 610, third doublet 614, and clock select state machine 622 are operative on NET_CLK, which may similarly not be available during certain intervals, for which the state machine remains in a previous state until the NET_CLK becomes available again. It is generally desirable for the NET_CLK to be asserted before and after NETCLK_OFF sufficiently long enough for the state machine to reach state SLEEP, where HOST_CLK is generated. Additionally, it is desirable for HOST_CLK to be active for a sufficient time following HST_CLK_AVAIL for the state machine to reach state WAIT, where no clock is generated until NET_CLK is again active.

What is claimed is:

1. A clock selector for a HOST_CLK and a NET_CLK clock source, said HOST_CLK associated with a HST_CLK_AVAIL which is asserted when said HOST_CLK is present, said NET_CLK associated with a NETCLK_OFF signal asserted when said NET_CLK is not available;

a first doublet register having an input coupled to a first register, said first register having an output coupled to the input of a second register, said second register output coupled to said first doublet register output, said first and said second register clocked by said HOST_CLK;

a second doublet register having an input coupled to a third register, said third register having an output coupled to the input of a fourth register, said fourth register output coupled to said second doublet register output forming a signal HCA, said third register and said fourth register clocked by said NET_CLK;

a third doublet register having an input coupled to a fifth register, said fifth register having an output coupled to the input of a sixth register, said sixth register output coupled to said third doublet register output forming a signal NCO, said fifth register and said sixth register clocked by said NET_CLK;

a clock select state machine having a first input coupled to said HCA and a second input coupled to said NCO, said clock select state machine containing state machine registers clocked by said NET_CLK, said state machine registers thereby generating a first output EN_HSTCLK and second output EN_NETCLK;

a first AND gate having one input coupled to said HST_CLK_AVAIL and also to said second doublet register input, said first AND gate other input coupled to said EN_NETCLK, said first AND gate output coupled to said first doublet register input;

a second AND gate having one input coupled to said HOST_CLK and the other input coupled to said first doublet register output;

a third AND gate having one input coupled to said NET_CLK and the other input coupled to said EN_NETCLK;

an OR gate generating said CLK_OUT output, said OR gate having one input coupled to said second AND gate output and the other input coupled to said third AND gate output.

2. The clock selector register of claim 1 where at least one of said first doublet, said second doublet, or said third doublet register include registers responsive to the falling edge of a clock.

3. The clock selector of claim 1 where said first doublet register is responsive to the falling edge of said HOST_CLK.

4. The clock selector of claim 1 where said second doublet register and said third doublet register is responsive to the falling edge of said NET_CLK.

5. The clock selector of claim 1 where said state machine is operative on the falling edge of said NET_CLK.

6. The clock selector of claim 1 where NETCLK_OFF input also disables said NET_CLK.

7. The clock selector of claim 1 where said HST_CLK_AVAIL is asserted after said HST_CLK becomes available.

8. The clock selector of claim 1 where when said NET_CLK_OFF is asserted and said NET_CLK is not present, an associated host interface is operative on said HOST_CLK, said host interface transferring and queuing said packets for transmission until said NET_CLK is available and said NET_CLK_OFF is no longer asserted, thereafter transmitting said queued packets.

9. The clock selector of claim 1 where said HOST_CLK is operative during intervals when packets are ready to be transferred to a communications processor accepting said HOST_CLK and said NET_CLK, and said HOST_CLK is not operative at other times.

10. A clock selector for a HOST_CLK and a NET_CLK clock source, said HOST_CLK associated with a HST_CLK_AVAIL which is asserted when said HOST_CLK is present, said NET_CLK associated with a NETCLK_OFF signal asserted when said NET_CLK is not available;
  a first doublet register having an input coupled to a first register, said first register having an output coupled to the input of a second register, said second register output coupled to said first doublet register output, said first and said second register clocked by said HOST_CLK;
  a second doublet register having an input coupled to a third register, said third register having an output coupled to the input of a fourth register, said fourth register output coupled to said second doublet register output forming a signal HCA, said third register and said fourth register clocked by said NET_CLK;
  a third doublet register having an input coupled to a fifth register, said fifth register having an output coupled to the input of a sixth register, said sixth register output coupled to said third doublet register output forming a signal NCO, said fifth register and said sixth register clocked by said NET_CLK;
  a clock select state machine having a first input coupled to said HCA and a second input coupled to said NCO, said clock select state machine generating a first output EN_HSTCLK and second output EN_NETCLK, said clock select state machine operative on edges of said NET_CLK;
  a first AND gate having one input coupled to said HST_CLK_AVAIL and also to said second doublet register input, said first AND gate other input coupled to said EN_NETCLK, said first AND gate output coupled to said first doublet register input;
  a second AND gate having one input coupled to said HOST_CLK and the other input coupled to said first doublet register output;
  a third AND gate having one input coupled to said NET_CLK and the other input coupled to said EN_NETCLK;
  an OR gate generating said CLK_OUT output, said OR gate having one input coupled to said second AND gate output and the other input coupled to said third AND gate output;
  and where said HOST_CLK is operative during intervals when packets are ready to be transferred to a communications processor accepting said HOST_CLK and said NET_CLK, and said HOST_CLK is not operative at other times.

11. The clock selector register of claim 10 where at least one of said first doublet, said second doublet, or said third doublet register include registers responsive to the falling edge of a clock.

12. The clock selector of claim 10 where said first doublet register is responsive to the falling edge of said HOST_CLK.

13. The clock selector of claim 10 where said second doublet register and said third doublet register is responsive to the falling edge of said NET_CLK.

14. The clock selector of claim 10 where said state machine is operative on the falling edge of said NET_CLK.

15. The clock selector of claim 10 where said NET_CLK_OFF input also disables said NET_CLK.

16. The clock selector of claim 10 where said HST_CLK_AVAIL is asserted after said HST_CLK becomes available.

17. The clock selector of claim 10 where when said NET_CLK_OFF is asserted and said NET_CLK is not present, an associated host interface is operative on said HOST_CLK, said host interface transferring and queuing said packets for transmission until said NET_CLK is available and said NET_CLK_OFF is no longer asserted, thereafter transmitting said queued packets.

* * * * *